United States Patent [19]

Nozawa et al.

[11] Patent Number: 4,583,433
[45] Date of Patent: Apr. 22, 1986

[54] TURNING CONTROL APPARATUS AND METHOD

[75] Inventors: Ryoichiro Nozawa, Tokyo; Hideaki Kawamura, Hachioji, both of Japan

[73] Assignee: Fanuc Ltd, Tokyo, Japan

[21] Appl. No.: 482,302

[22] Filed: Apr. 5, 1983

[51] Int. Cl.$^4$ .................. B23B 1/00; B23B 5/46
[52] U.S. Cl. .................. 82/1 C; 82/2 B; 82/5
[58] Field of Search .................. 82/5, 2 B, 1 C

[56] References Cited

U.S. PATENT DOCUMENTS

| 3,595,106 | 7/1971 | Pomella et al. | 82/1 C |
| 4,096,770 | 6/1978 | Tanner | 82/2 B |

FOREIGN PATENT DOCUMENTS

| 480898 | 9/1968 | Fed. Rep. of Germany. |
| 2246375 | 9/1972 | Fed. Rep. of Germany. |
| 2427531 | 7/1974 | Fed. Rep. of Germany. |
| 2821760 | 5/1978 | Fed. Rep. of Germany. |
| 798609 | 7/1953 | United Kingdom | 82/5 |
| 1524176 | 1/1977 | United Kingdom. |

Primary Examiner—Leonidas Vlachos
Attorney, Agent, or Firm—Staas & Halsey

[57] ABSTRACT

A method and apparatus for controlling a turning operation in which a workpiece, rotated by a spindle, is cut by a cutting tool transported axially of the spindle in synchronization with the rotation thereof. The rotational speed of the spindle is sensed prior to the start of cutting, and the tool position axially of the spindle is corrected prior to the start of cutting based on the sensed rotational speed. Alternatively, once the rotational speed of the spindle has been sensed, a correction based on the sensed speed can be effected in the position at which a signal indicative of one spindle revolution is generated. The signal acts as a start signal to initiate cutting of the workpiece.

7 Claims, 9 Drawing Figures

Fig. 4(A)
Fig. 4(B)
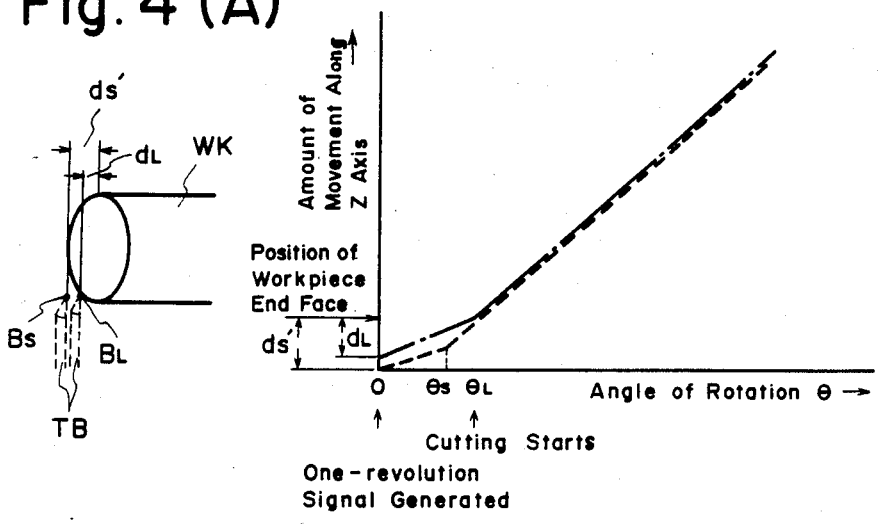
Fig. 5
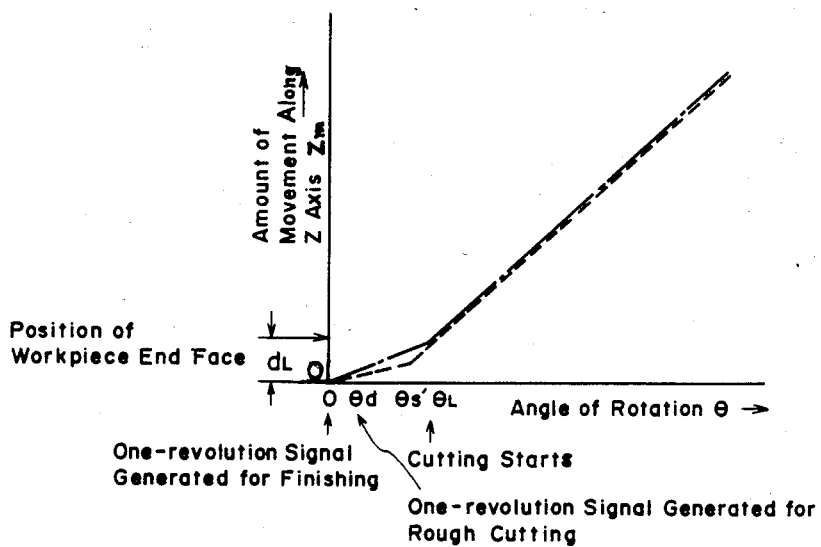

TURNING CONTROL APPARATUS AND METHOD

BACKGROUND OF THE INVENTION

This invention relates to an apparatus and method for controlling a turning operation and, more particularly, to a turning control apparatus and method wherein spindle speed may be varied without either defacing screw threads or diminishing the dimensional accuracy of a screw.

A turning machining operation, such as may be applied to the cutting of screws and gears or to the grinding of gear wheels, requires that movement of the workpiece or tool cutting the workpiece be synchronized with the rotation of the machine tool spindle. When cutting a screw, for example, failure to synchronize movement of the cutting tool along the Z-axis with rotation of the spindle results in a screw of poor dimensional precision or causes the formation of double threads or the defacement of threads when the screw is subjected to finishing work. For this reason, a signal is generated at each revolution of the spindle, movement of the cutting tool along the Z-axis is started in synchronization with the signal, and subsequent feed along said axis is made synchronous with spindle rotation, based on the generated signal. Also, in view of a delay attributed to the associated servo system, in the prior art the same rotational speed is adopted for both rough machining and finishing machining. The reason for the latter will now be set forth.

Theoretically, cutting speed can be raised for finishing work because the load sustained during finishing is lighter than that which prevails during rough machining. When the rotational frequency (r.p.m.) of the spindle and the synchronized feed speed along the Z axis are made m times greater than what would prevail during rough machining, however, the amount of delay imposed by the Z-axis servo system differs from the delay which occurs during rough machining. The servo delay d is proportional to the feed speed f and is expressed by the following:

$$d = f/k \qquad (1)$$

where k the servo system gain. The difference in delay between the rough and finishing machining operations would give rise to a screw cutting error, making it impossible to cut a screw to a high precision. It is for this reason that the spindle is rotated at the same speed for both rough machining and finishing.

A disadvantage encountered in the prior art, therefore, is that a highly efficient operation cannot be achieved since it is necessary to perform the finishing process at the slow speed decided by rough machining.

SUMMARY OF THE INVENTION

Accordingly, an object of the present invention is to provide a turning control apparatus and method wherein the rotational speed of the spindle can be varied from one speed during rough machining to another speed during finishing work.

Another object of the present invention is to provide a turning control apparatus and method wherein machining time can be shortened by varying the rotational speed of a spindle when required without causing any deviation is the path of the thread being cut.

A further object of the present invention is to provide a turning control apparatus and method wherein total machining time is shortened and a highly accurate screw cutting operation achieved when the same workpiece is subjected to screw cutting work such as rough cutting and finishing by various cutting tools that are exchanged for one another.

According to the present invention, the foregoing objects are attained by providing a system for controlling a turning operation in which a workpiece, rotated by a spindle, is cut by a cutting tool transported axially of the spindle in synchronization with the rotation thereof. The rotational speed of the spindle is sensed prior to the start of cutting, and the tool position axially of the spindle is corrected prior to the start of cutting based on the sensed rotational speed. In another aspect of the invention, once the rotational speed of the spindle has been sensed, a correction based on the sensed speed can be effected in the position at which a signal indicative of one spindle revolution is generated. The signal acts as a start signal to initiate cutting of the workpiece. In either case, cutting will always start from the same angular position of the workpiece so that a thread to be cut will not deviate from the intended path even when the rotational speed of the spindle is changed. This permits machining speed for finishing to be made larger than that for rough machining, thereby shortening machining time. A highly accurate threading operation is possible despite variations in spindle speed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B, which are views useful in describing the principle of the present invention, showing how the stopping position of a cutting tool prior to the start of threading work is changed in accordance with the rotational speed of a spindle;

FIG. 5, which is a view useful in describing the principle of the present invention, shows how a position at which a one-revolution signal is generated is changed in accordance with the rotational speed of a spindle;

DESCRIPTION OF THE PREFERRED EMBODIMENT

Figure 1:
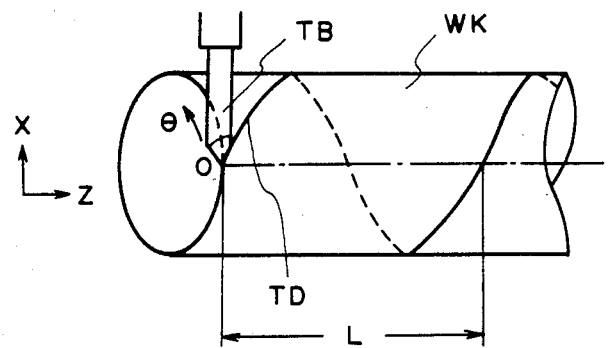
FIG. 1 is a diagrammatic representation useful in describing a threading operation.

With reference to FIG. 1 illustrating a screw threading operation in diagrammatic form, a workpiece WK is rotated at a constant speed by a spindle motor, not shown, while a cutting tool TB is transported at a predetermined speed along the Z axis, namely axially of the spindle, so that the nose of the cutting tool may cut a thread groove TD in the outer peripheral surface of the workpiece WK. If L (mm/rev) represents the lead of the screw, feed will be so controlled that the cutting tool TB travels L mm. per spindle revolution. To cut a screw having the same lead L at, say, twice the feed speed, therefore, the rotational speed of the spindle motor will also need to be doubled.

Figure 2:
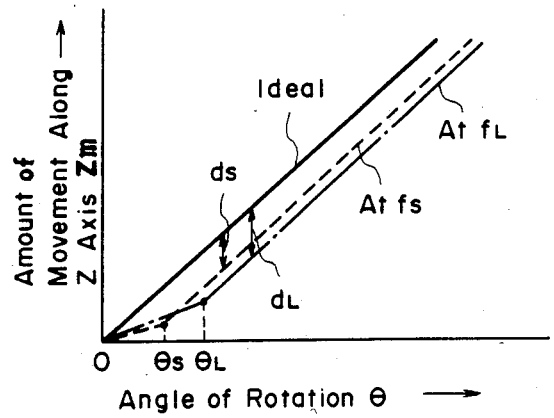
FIG. 2 is a development of a thread groove where a workpiece is cut along one side thereof and the workpiece surface developed in a plane.
Figure 3:
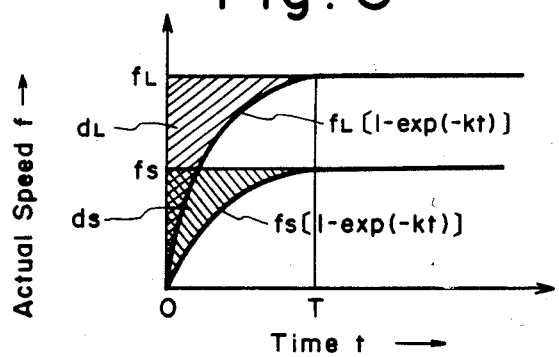
FIG. 3 is a view showing the delay characteristic of a servo system.

FIG. 2 is useful in describing the cutting of a thread groove and represents a development of the peripheral surface of the workpiece WK obtained by cutting the surface along the dot-and-dash line, shown in FIG. 1, and developing the surface in a plane. The solid line in FIG. 2 is a development of an ideal thread groove, while the dashed line and dot-and-dash line are developments of thread grooves at feed speeds of $f_S$ and $f_L$, respectively, where $f_L > f_S$. In the ideal case where servo system delay is non-existent, the thread groove will always be cut in accurate fashion, as indicated by the solid line, regardless of the feed speed. Delay does exist in actual practice, however, and is dependent upon feed speed. Specifically, as shown in FIG. 3, the actual speed f at which the tool TB moves is expressed by the following for the feed speed $f_S$:

$$f = f_S[1 - \exp(-kt)]$$

so that there is a delay of $d_S$ $(=f_S/k)$. Similarly, the actual speed f for the feed speed $f_L$ is expressed by:

$$f = f_L[1 - \exp(-kt)]$$

the delay being $d_L$ $(=f_L/k)$. As a consequence, when the Z-axis feed motor is started, the actual speed will attain the commanded feed speed $f_S$ or $f_L$ upon passage of a length of time corresponding to a time constant T (equivalent to 1/k, which is the reciprocal of the gain). Because of the relation $f_S < f_L$, the relation $r_S < r_L$ will hold with respect to the rotational speed of the spindle (where $r_S$, $r_L$ are the rotational speeds which prevail at the feed speeds $f_S$, $f_L$, respectively), so that the angular positions $O_S$, $O_L$ of the spindle (workpiece) upon attainment of the feed speeds $f_S$, $f_L$, respectively, will be related by the inequality $O_S < O_L$. The result is that the cutting tool cuts the thread groove indicated by the dashed line in FIG. 2 when the feed speed $f_S$ is commanded, and by the dot-and-dash line when the feed speed $f_L$ is commanded.

It follows from the foregoing that conducting the threading operation at the feed speed $f_S$ during rough machining and at the feed speed $f_L$ for finishing work will cause the tool nose to follow paths that are not in agreement, resulting in double or overlapping threads or in a screw of poor dimensional precision.

Accordingly, if control is so executed in such a manner that threading can be carried out after the Z-axis feed speed attains a constant speed and from the same angular position regardless of the magnitude of the feed speed, then highly accurate threading will take place even if the feed speed and rotational speed are changed.

Therefore, according to a feature of the present invention which may be understood from FIG. 4A, the position along the Z-axis at which the cutting tool TB is stopped prior to beginning threading is changed between positions $B_S$ and $B_L$, depending upon the rotational speed of the spindle. The stopping positions may be decided in the following manner, serving as one example.

In FIG. 2, when the feed speed $f_L$ is commanded for finishing machining (the rotational speed of the spindle being $r_L$ for finishing, as mentioned above), the actual speed of the Z-axis feed motor attains the commanded value of $f_L$ after the delay $d_L$ $(=f_L/k)$, and the angular position of the spindle assumes the value $O_L$. Accordingly, if the position at which the tool is stopped prior to the start of the finishing operation is spaced away from the end face of the workpiece WK by a distance equivalent to $d_L$ (FIGS. 4A and 4B), then the constant feed speed of $f_L$ will be reached, and the workpiece will be subjected to the finishing process, starting at the angular position $O_L$ after the generation of a signal indicative of the one revolution. On the other hand, the position at which the tool is stopped prior to rough machining is spaced from the end face of the workpiece WK by a distance equivalent to $D_S'$ (FIGS. 4A and 4B). Consequently, the constant speed of $f_S$ will be reached at the angular position $O_S$ after the generation of the one-revolution signal, and threading will start at the feed speed $f_S$ exactly from the angular position $O_L$. In other words, machining begins from a fixed angular position for both finishing and rough machining, and the feed speeds of $f_L$ and $f_S$ are attained by the time the machining operation starts. A further description of this feature of the invention will be had later in conjunction with FIG. 6.

According to another feature of the invention, the angular position at which the one-revolution signal is generated is changed while the position at which the cutting tool is stopped prior to machining is kept fixed, thereby holding the machining starting position constant and establishing a constant rotational speed at said starting position. This will now be described with reference to FIG. 5.

It was described in connection with FIG. 2 that when the feed speed $f_L$ is commanded for finishing machining, the actual speed of the Z-axis feed motor attains the commanded value $f_L$ after the delay $d_L$ $(=f_L/k)$, and that the angular position of the spindle assumes the value $O_L$. Accordingly, by spacing the cutting tool from the end face of the workpiece WK by the distance equivalent to $d_L$ prior to the finishing operation, the constant feed speed of $f_L$ is reached and the workpiece is subjected to finishing starting at the angular position $O_L$ after the generation of the one-revolution signal. Now, rather than establishing a different stopping position for the tool prior to rough machining, which is the approach taken in FIG. 4, the angular position at which a one-revolution signal is generated is, in effect, shifted to the right by an amount $O_d$ in FIG. 5. In other words, the generation of a one-revolution signal is delayed by an amount corresponding to $O_d$. Thus, a corrected one-revolution signal for rough machining is generated after the delay Od, which is measured from the instant at which a "true" one-revolution pulse is produced by a pulse coder, described later. The result is that machining will begin from a fixed angular position for both finishing and rough machining, with the feed speeds of $f_L$ and $f_S$ being attained by the time the machining operation starts. This aspect of the invention will be described later in further detail with reference to FIG. 7.

Figure 8:
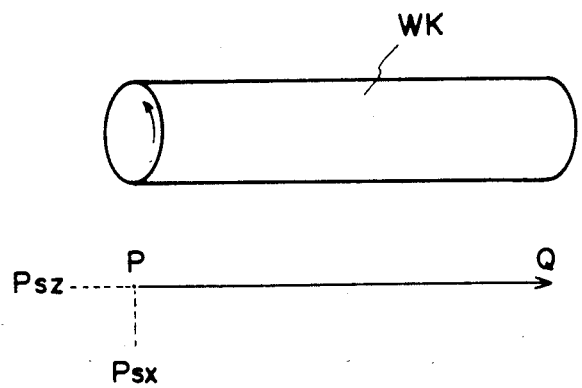
FIG. 8 shows the threading starting position on the workpiece and the direction of its shift according to the present invention.

On further consideration of above operations, it becomes obvious that a shift of the threading starting position along the Z-axis i.e. axially of the spindle, is equivalant to a shift along the X-axis which is perpendicular to the spindle. This will be described in reference to FIG. 8. In FIG. 8, it is assumed that the programmed threading starting position is P, that the programmed threading stopping position is Q, that the threading starting position when the starting position is shifted along the Z axis is Psz, and that the threading starting position when the starting point is shifted along the X-axis is Psx. In a case where the threading starting position is shifted along the X-axis, the threading operation will proceed from Psx to P and from P to Q after detection of the one revolution signal, following movement of the cutting tool or workpiece to the point Psx.

Figure 6:
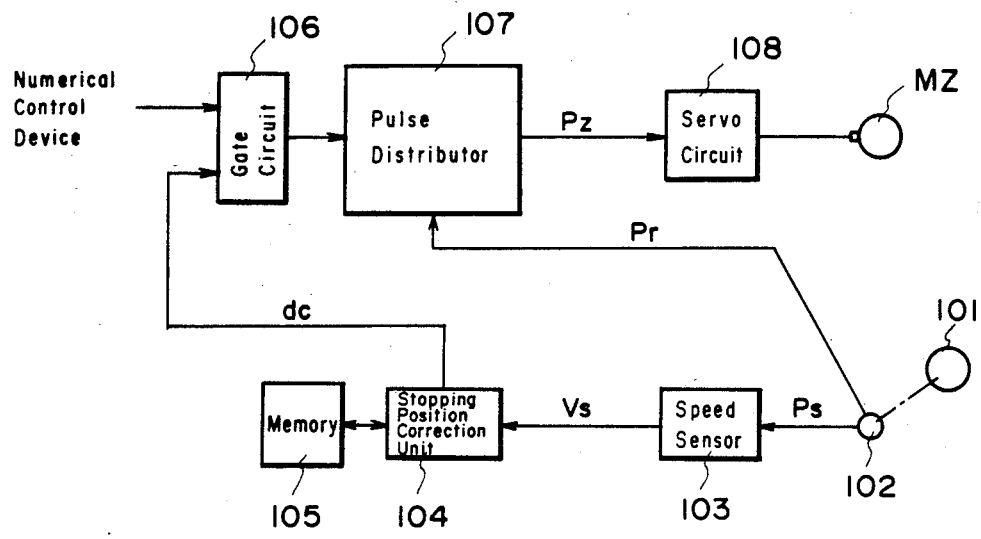
FIG. 6 is a block diagram illustrating a first embodiment of a turning control apparatus according to the present invention.

Reference will now be had to the block diagram of FIG. 6 to describe a first embodiment of a turning control apparatus according to the present invention, wherein the stopping position of the cutting tool prior to the start of machining is changed in accordance with the rotational speed of the spindle.

In response to a command from a numerical control device (not shown), the cutting tool TB ordinarily is brought to rest at a position $B_L$ spaced from the end face of the workpiece WK by a distance corresponding to $d_L$ (FIG. 4) prior to the start of machining. A spindle motor 101 for rotating the workpiece has a pulse coder 102 mounted on its shaft. The pulse coder 102 is adapted to generate a single pulse $P_s$ each time the spindle motor 101 rotates through a predetermined angle, as well as a one-revolution pulse $P_r$ produced each time the spindle motor makes one full revolution. A speed sensor 103 counts the number of pulses $P_s$ generated over a fixed length of time to thereby sense the rotational speed $V_s$ of the spindle motor 101, a signal indicative of $V_s$ being applied to a tool stopping position correction unit 104. The latter produces a signal indicative of a distance $d_c$, based upon a relation between rotational speed and tool stopping position, which relation is stored previously in a memory 105. The distance $d_c$ is equivalent to a distance given by $d_S' - d_L$, namely the distance between the stopping position $B_L$ (FIG. 4) when finishing is to be performed, and the stopping position $B_S$ when rough machining is to be carried out. The signal indicative of $d_c$ is applied to a pulse distributor 107 through a gate circuit 106, the pulse distributor 107 performing a known pulse distribution operation based on $d_c$ to produce distributed pulses $P_z$, the number whereof corresponds to $d_c$. A Z-axis servo circuit 108 responds to the pulses $P_z$ to rotate a Z-axis servomotor MZ, which in turn transports the cutting tool to move its nose from point $B_L$ to point $B_S$.

Now assume that the numerical control device issues a numerical command for the threading operation, and that the gate circuit 106 allows the command to pass. Then, when the pulse coder 102 subsequently generates a one-revolution pulse Pr, the pulse distributor 107 responds by initiating a pulse distribution based on the numerical command applied thereto, whereby the rotation of the Z-axis servomotor MZ is controlled to transport the cutting tool along the Z axis. The feed speed becomes constant at the angular position $O_S$, and cutting starts from the angular position $O_L$.

Figure 7:
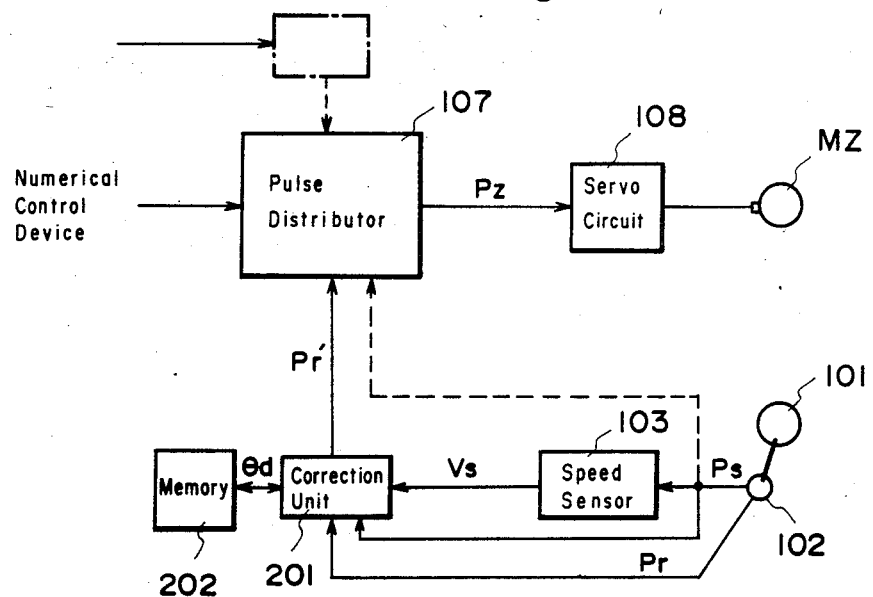
FIG. 7 is a block diagram illustrating a second embodiment of a turning control apparatus according to the present invention.

FIG. 7 is a block diagram illustrating a second embodiment of a turning control apparatus according to the present invention, wherein a correction is made in the position at which the one-revolution signal is generated.

As described above with reference to the embodiment of FIG. 6, a command from the numerical control device stops the cutting tool at a position spaced from the end face of the workpiece WK by a distance corresponding to $d_L$ (FIG. 5) prior to the start of machining. The pulse coder 102 generates a single pulse $P_s$ each time the spindle motor 101 rotates through a predetermined angle, and a one-revolution pulse $P_r$ produced each time the spindle motor makes one full revolution. A speed sensor 103 counts the number of pulses $P_s$ generated over a fixed length of time to sense the rotational speed $V_s$ of the spindle motor 101, and produces the signal indicative of $V_s$. In accordance with this embodiment of the invention, the signal $V_s$ is applied to a correction unit 201 for producing a signal indicative of a changed, or corrected, position for generation of the one-revolution signal, as will be described below. The correction unit 201 provides the abovementioned angle of rotation $O_d$ using a relation between rotational speed and the position at which the one-revolution pulse $P_r$ is generated, the relation being obtained from a memory 202. The angle of rotation $O_d$ is expressed as the number of pulses $P_s$ generated by the pulse coder 102. Accordingly, after the pulse coder 102 produces the one revolution pulse $P_r$, the correction unit 201 produces a one-revolution signal $P_r'$ at the instant that $O_d$-number of pulses $P_s$ are generated by the pulse coder. As seen from the pulse distributor 107, the one-revolution signal $P_r'$ is generated at an angular position different from that at which the one-revolution pulse Pr is produced. The pulse distributor 107, in response to the signal $P_r'$, starts producing distributed pulses $P_z$ based on a numerical command for threading received from the numerical control device. The distributed pulses control the rotation of the Z-axis motor MZ through the servo circuit 108, so that the cutting tool starts to be moved along the Z axis. The feed speed becomes constant at the angular position $O_S$, and machining starts from the angular position $O_L$.

Thus the spindle rotational speed during rough machining is stored in the memory, while the spindle rotational speed during finishing machining is picked up by the speed sensor, and the difference between these rotational speeds is obtained. During finishing machining operation, the one-revolution signal or machining starting position on the workpiece is shifted according to the difference. Following the above, the object of the present invention is achieved.

In accordance with the present invention as described and illustrated hereinabove, a thread being cut will not deviate from the intended path even when the rotational speed of the spindle is changed. This permits machining speed for finishing to be made larger than that for rough machining, thereby shortening machining time. A highly accurate threading operation is possible despite variations in spindle speed.

As many apparently widely different embodiments of the present invention can be made without departing from the spirit and scope thereof, it is to be understood that the invention is not limited to the specific embodiments thereof except as defined in the appended claims.

What we claim is:

1. A turning control apparatus for controlling cutting of a workpiece connected to and rotated by a spindle having an axis corresponding to a Z-axis, a cutting tool cutting the workpiece in multiple cutting operations as relative positions of the cutting tool and the workpiece change in synchronization with rotation of the spindle, said apparatus comprising:
   sensing means for sensing a rotational speed of the spindle prior to the cutting;

Z-axis movement means for controlling acceleration of relative movement of the cutting tool and the workpiece parallel to the Z-axis from non-movement to a feed speed with an associated delay and for maintaining the feed speed during the cutting of the workpiece;

calculating means, operatively connected to said sensing means, for calculating a starting position along an X-axis perpendicular to the Z-axis for a cutting approach in dependence upon the rotational speed, the rotation of the spindle and the feed speed, so that the cutting tool starts cutting the workpiece at a single angular position on each of the multiple cutting operations after the associated delay; and X-axis movement means, operatively connected to said calculating means, for controlling movement of the relative positions of the cutting tool and the workpiece to the starting position along the X-axis.

2. A turning control apparatus according to claim 1, wherein said X-axis movement means comprises means, operatively connected to said calculating means and the workpiece, for transporting the workpiece along the X-axis to the starting position.

3. A turning control method for controlling cutting of a workpiece, connected to and rotated by a spindle having an axis corresponding to a Z-axis, a cutting tool cutting the workpiece as relative positions of the cutting tool and the workpiece change at a feed speed, in a direction parallel to the Z-axis and in synchronization with rotation of the spindle, said method comprising the steps of:

(a) sensing a rotational speed of the spindle prior to starting the cutting;

(b) selecting a relative starting position of the cutting tool and the workpiece along an X-axis perpendicular to the Z-axis based on the feed speed and the rotational speed sensed in step (a);

(c) moving the cutting tool relative to the workpiece along the X-axis and accelerating relative movement of the cutting tool and the workpiece parallel to the Z-axis until the feed speed is reached; and (d) starting cutting after the feed speed along the Z-axis is reached and at a substantially identical angular position of the workpiece, regardless of the feed speed.

4. A turning control method according to claim 3, wherein step (b) comprises transporting the workpiece along the X-axis.

5. A turning control method for controlling cutting of a workpiece connected to and rotated by a spindle having an axis corresponding to a Z-axis, a cutting tool cutting the workpiece as relative positions of the cutting tool and the workpiece change in synchronization with rotation of the spindle, said method comprising the steps of:

(a) sensing rotational speed of the spindle prior to starting the cutting;

(b) generating a signal indicative of one spindle revolution to serve as a signal for starting cutting, the signal being generated at a position selected in dependence upon the rotational speed sensed in step (a); and (c) starting cutting after feed speed along the Z-axis becomes constant and at an identical angular position of the workpiece, regardless of the feed speed.

6. A turning control apparatus for controlling cutting of a workpiece by a cutting tool, the workpiece, mounted on a rotating spindle, being cut by repeated initial positioning of the cutting tool and the workpiece followed by changing the relative positions of the cutting tool and the workpiece in synchronization with rotation of the spindle, said turning control apparatus comprising:

sensing means for sensing a rotational speed of the spindle and generating a one-revolution signal;

starting means, operatively connected to said sensing means, for generating a start signal to start changing the relative positions of the cutting tool and the workpiece, the start signal being generated in dependence upon the rotational speed and the one-revolution signal and at a time which results in the cutting starting at one angular position of the workpiece after each initial positioning; and means, operatively connected to said starting means and at least one of the cutting tool and the workpiece, for changing the relative positions of the cutting tool and the workpiece after receiving the start signal.

7. A turning control method for controlling cutting of a workpiece by a cutting tool, the workpiece mounted on a rotating spindle, said method comprising the steps of:

(a) determining a first rotational speed of the spindle;

(b) positioning the cutting tool and the workpiece with a distance therebetween;

(c) generating a first start signal with a first timing in dependence upon the first rotational speed and rotational positioning of the spindle;

(d) changing relative positions of the cutting tool and the workpiece in synchronization with the rotating spindle after the first start signal is generated to cut the workpiece starting at a rotational position;

(e) repeating steps (a) and (b) for a second rotational speed;

(f) generating a second start signal in dependence upon the second rotational speed and the rotational positioning of the spindle with a second timing different than the first timing; and (g) changing the relative position of the cutting tool and the workpiece in synchronization with the rotating spindle after the second start signal is generated to cut the workpiece starting at the rotational position at which cutting started in step (d).

* * * * *

UNITED STATES PATENT AND TRADEMARK OFFICE
CERTIFICATE OF CORRECTION

PATENT NO. : 4,583,433
DATED : April 22, 1986
INVENTOR(S) : Nozawa et al.

It is certified that error appears in the above-identified patent and that said Letters Patent is hereby corrected as shown below:

On the title page:

Below [22], at left margin, insert the following:

--[30] Foreign Application Priority Data

April 6, 1982 [JP] Japan................57-57026 --.

Col. 4, line 19, "$D_S$," should be --$d_S'$--.

Signed and Sealed this

Nineteenth Day of August 1986

[SEAL]

Attest:

Attesting Officer

DONALD J. QUIGG

Commissioner of Patents and Trademarks